United States Patent [19]
Roth et al.

[11] Patent Number: 5,339,510
[45] Date of Patent: Aug. 23, 1994

[54] METHOD FOR PRESS FITTING A PIVOT PIN FOR A WIPER ASSEMBLY

[75] Inventors: Christian Roth, Bietigheim-Bissinger; Wolfgang Scholl, Gemmrigheim, both of Fed. Rep. of Germany

[73] Assignee: ITT Automotive Europe GmbH, Frankfurt am Main, Fed. Rep. of Germany

[21] Appl. No.: 92,517

[22] Filed: Jul. 16, 1993

Related U.S. Application Data

[60] Division of Ser. No. 901,912, Jun. 22, 1992, Pat. No. 5,271,122, which is a continuation of Ser. No. 585,149, Nov. 8, 1990, abandoned.

[30] Foreign Application Priority Data

Feb. 16, 1989 [DE] Fed. Rep. of Germany ....... 3904620

[51] Int. Cl.⁵ .......................... B23P 19/02; B60S 1/38
[52] U.S. Cl. .......................... 29/436; 29/432; 29/437; 29/451; 29/DIG. 7; 15/250.31; 15/250.36; 403/154
[58] Field of Search .......... 15/250.31, 250.35, 250.36, 15/250.41, 250.42; 29/434, 436, 437, 450–453, DIG. 7, 432, 432.1, 432.2, DIG. 53, DIG. 94; 403/24, 150, 152, 153, 154, 161, 163

[56] References Cited

U.S. PATENT DOCUMENTS

| | | | |
|---|---|---|---|
| 2,642,318 | 6/1953 | Ricks | 403/152 |
| 3,132,367 | 5/1964 | Wise | 15/250.42 |
| 3,585,672 | 6/1971 | Habert | 15/250.32 |
| 3,943,908 | 3/1976 | Kubis et al. | 403/152 X |
| 4,076,430 | 2/1978 | Crook, Jr. | 403/154 |
| 4,638,544 | 1/1987 | McNeil | 29/434 |
| 4,795,288 | 1/1989 | Sakai | 403/153 |

FOREIGN PATENT DOCUMENTS

| | | |
|---|---|---|
| 0280806 | 9/1988 | European Pat. Off. . |
| 0281397 | 9/1988 | European Pat. Off. . |
| 2324276 | 12/1973 | Fed. Rep. of Germany ... 15/250.42 |
| 2415563 | 8/1979 | France . |
| 8800147 | 1/1988 | World Int. Prop. O. . |

*Primary Examiner*—Peter Dungba Vo
*Attorney, Agent, or Firm*—Robert P. Seitter; J. Gordon Lewis

[57] ABSTRACT

A method of manufacturing a wiper blade for a windshield wiper system of a motor vehicle is described, in which wiper blade a pivot pin, that is cylindrical all along its length, is non-rotatably fixed onto a secondary yoke and engages into bearing bushes by way of its ends, which bearing bushes are non-rotatably fixed into the side walls of a primary yoke. This articulated connection is advantageous with respect to corrosional behaviour and thus with respect to the lifetime in comparison to known articulated connections with an articulated rivet that is non-rotatably connected with the primary yoke.

7 Claims, 1 Drawing Sheet

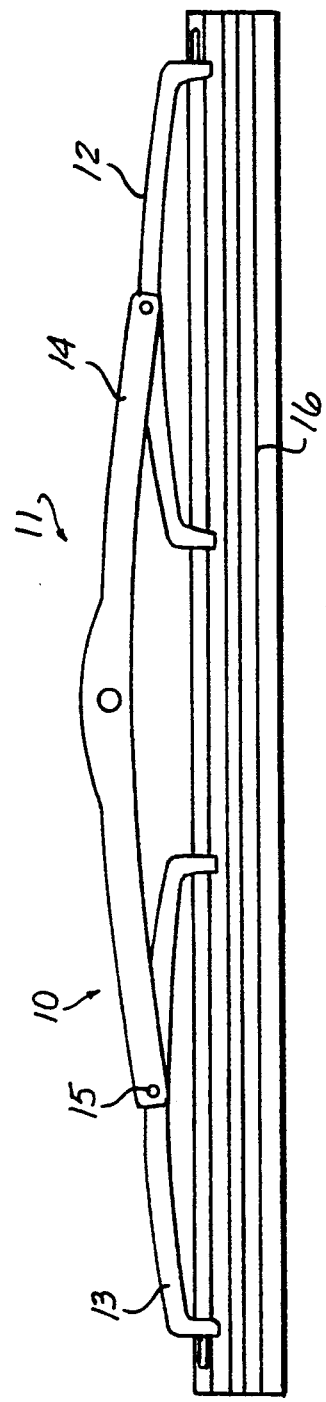
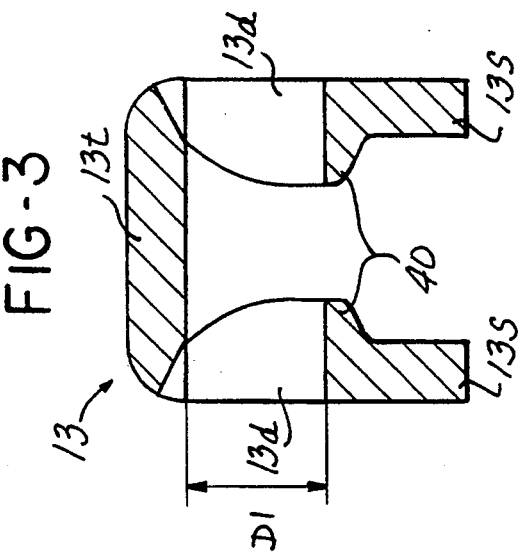
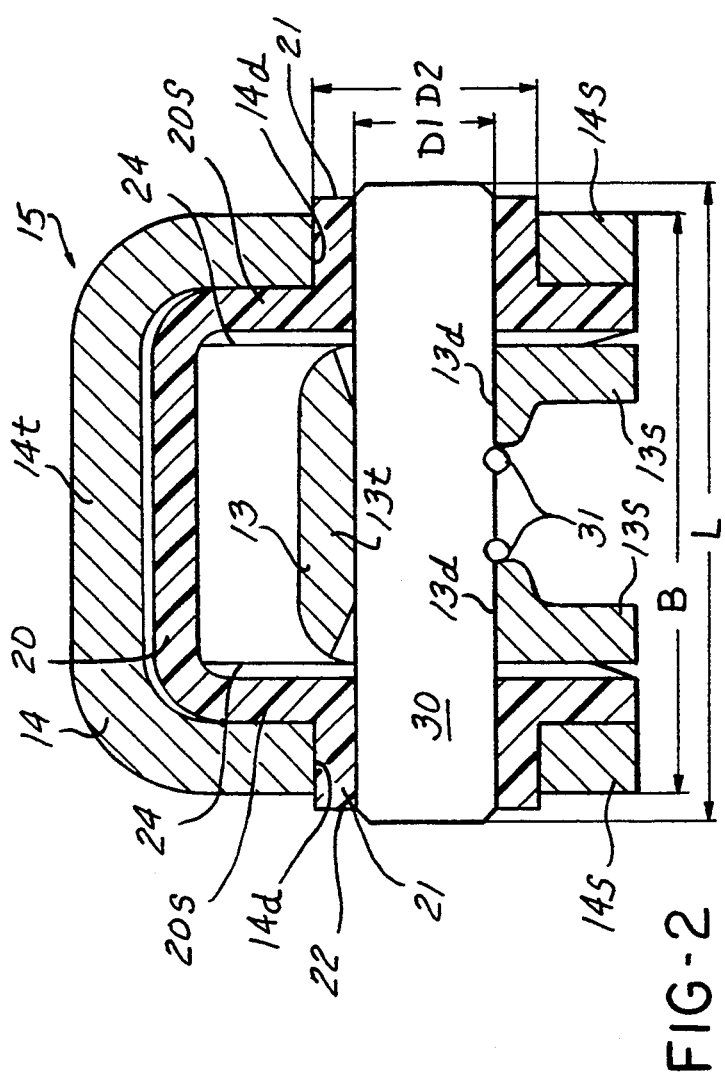

METHOD FOR PRESS FITTING A PIVOT PIN FOR A WIPER ASSEMBLY

RELATED APPLICATIONS

This is a divisional application of Ser. No.07/901,912, filed Jun. 22, 1992 now U.S. Pat. 5,271,122, which was a continuation of application Ser. No. 07/585,149, filed Nov. 8, 1990, now abandoned.

INTRODUCTION

The invention relates to a wiper blade, especially for windshield wiper systems of motor vehicles.

BACKGROUND OF THE INVENTION

In modern motor vehicles with bent windshields mainly wiper blades are used, which wiper blades comprise a carrier yoke system consisting of several parts for guiding a rubber element. The carrier yoke system mostly includes a primary yoke, namely a primary yoke onto which two secondary yokes, namely clawed yokes, are swivellably mounted. In wiper blades of little length the secondary yoke is mounted onto the primary yoke via a plastic link with pivot pins laterally sticking out. In wiper blades of bigger length the secondary yoke is connected with the primary yoke via a metallic rivet pin. Concerning both solutions there are advantages and disadvantages. When using a plastic link, the mostly metallic yokes are prevented from touching each other and thus disturbing noises are avoided. However, these embodiments with a plastic link do not always meet the requirement of stability and unadmissably big play cannot be avoided after a longer time of operation.

The stability of the rivetted wiper blades is better, but the corrosional behaviour does not meet all the requirements, for in these wiper blades the rivet head is formed by a tumbling rivetting process so that a press-fit is produced by deforming the rivet shank immediately under the rivet head, and the articulated rivet and the primary yoke are connected with each other in a sufficiently firm way. However, during this tumbling rivetting process sometimes the varnish of the yoke is damaged so that at this point corrosion is increased. Thus, however, the rivet connection is also damaged so that, after all, a non-rotatable connection between the articulated rivet and the primary yoke is no longer guaranteed. The consequence thereof is that again the apertures in the side walls of the primary yoke are worn out and that thus the play in the articulation becomes so big that the wiping effect is no longer sufficient.

BRIEF DESCRIPTION OF THE INVENTION

An object of the present invention is to develop a wiper blade of the sort mentioned at the beginning in such a way that the articulation between a primary yoke and a secondary yoke meets all the requirements even after a long time of operation.

Thereby the present invention is based on the idea that a connection between the yokes can be provided by using easy means when combining elements of two constructional principles properly. Thus with respect to the solution according to the invention again, a pivot pin is used, which pivot pin, however, in contrast to the known rivet connections, is non-rotatably connected with the secondary yoke. This pivot pin projects into the apertures in the side walls of the primary yoke and there it is rotatably mounted in a separate bearing bush. These bearing bushes are preferably made of plastics so that this pivot pin and the primary yoke are prevented from touching each other metallically. Thus corrosional damages with respect to the primary yoke need not be feared. In comparison to the known embodiments with a rivet pin, in the embodiment according to the invention the effective length of the bearing is substantially increased, for, whereas in the known embodiments bearing surfaces between the side walls of the secondary yoke and the pivot pin are formed, in the embodiments according to the invention the bearing surfaces are displaced into the area of the side walls of the primary yoke. Thus the bearing surfaces are substantially less strained so that a longer lifetime can be reckoned upon.

If the pivot pin non-rotatably connected with the secondary yoke is held on the secondary yoke so as to prevent relative axial displacement, the rivet heads are not needed. Thus the embodiment according to the invention a simple cylindrical pivot pin can be used, which pivot pin can be produced in a big number of pieces, for instance as a bearing needle. The stability of such bearing needles is sufficient and due to the treatment of their surfaces their gliding qualities are good. Moreover, the advantage of this construction is that no rivet heads need to be formed and that thus the varnish at the outer sides of the side walls of the primary yoke is not damaged.

In a preferred embodiment of the invention the bearing bushes non-rotatably fixed in the apertures of the primary yoke are integrally arranged on a U-shaped distance member inserted between the two yokes so that they can be assembled at low costs. Thereby in a known manner due to this distance member the two yokes are prevented from touching each other metallically.

The invention is described by way of the embodiment illustrated in the accompanying drawings

BRIEF DESCRIPTION OF THE DRAWINGS

FIG. 1 is a lateral view of a wiper blade,
FIG. 2 is section of the linking point and
FIG. 3 is a section of a secondary yoke.

DETAILED DESCRIPTION OF THE PREFERRED EMBODIMENT

FIG. 1 illustrates a wiper blade 10 with a carrier yoke system 11 comprising two clawed yokes 12 and 13 and a main yoke 14. The clawed yokes 12, 13 can also be called secondary yokes which are swivellably mounted onto a primary yoke 14 via an articulation point 15. In a known way the clawed yokes 12, 13 serve for guiding a rubber element 16.

FIG. 2 is an enlarged view of the linking point 15 between the clawed yoke 13 and the main yoke 14. This representation makes evident that the yokes comprise two side walls 13s, 14s each parallelly arranged to each other as well as a web 13t, 14t connecting these side walls. Apertures 13d, 14d are worked into the side walls 13s, 14s of the yokes generally having a U-shaped cross-section. FIG. 2 shows that the secondary yoke 13 is extended by the primary yoke 14 in such a way that these apertures 13d, 14d in the side walls 13s, 14s are coaxially arranged to each other.

A distance member or spacer 20 made of plastics also having a U-shaped cross-section is inserted between the secondary yoke 13 and the primary yoke 14. This distance member 20 integrally comprises bearing bushes on the side walls 20s, which bearing bushes engage into the apertures 14d in the primary yoke 14. The transverse sides 22 of the bearing bushes slightly extend outwardly of the outer sides of the side walls 14s of the primary yoke. On the inner side ribs 24 are formed onto walls 20s of the distance member 20, onto which ribs 24 the side walls 13s of the secondary yoke 13 are lying without play.

The two yokes 13, 14 are connected with each other via a pivot pin generally designated by 30, which pivot pin 30 is inserted through a bearing bush 21 after the apertures 13d, 14d being coaxially arranged. It is important for the present invention that this pivot pin 30 is non-rotatably connected with the secondary yoke 13. For this purpose the apertures 13d have a diameter D1 in the side walls 13s of the secondary yoke 13, which diameter D1 is slightly smaller than the diameter of the pivot pin 30. Consequently pivot pin 30 is non-rotatably connected with the secondary yoke 13 by press-fit. Besides, for securing the position in axial direction projections 31 can be punched out of the pivot pin 30. Thus in the embodiment according to the invention the pivot pin 30 is non-rotatably connected with the secondary yoke 13 and is protected against moving in axial direction. The bearing bushes 21 for the pivot pin 30 rotating with the secondary yoke 13 are non-rotatably fixed in the apertures 14d in the primary yoke 14. Thus during a swivelling movement between the secondary yoke and the primary yoke the bearing surfaces are in the area of these articulated bushes 21 so that with respect to the embodiment according to FIG. 2 the effective length of the bearing is bigger than with respect to the known rivetted wiper blades in which the relative movement is carried out between the secondary yoke and the articulated rivet.

FIG. 2 makes clear that the pivot pin 30 is of continually the same cross-section. Of course, in such an embodiment the diameter D2 in the side walls of the primary yoke has to be bigger than the diameter of the apertures in the side walls of the secondary yoke so that sufficient space is provided for receiving the bearing bush 21. FIG. 2 illustrates that the length L of the pivot pin is slightly bigger than the width B of the primary yoke. Thus the pivot pin slightly extends outwardly of the side walls 14s of the primary yoke 14. So it is avoided that the side walls 14s are damaged by the tool when beating this pivot pin into the apertures of the secondary yoke. For the same reason the bearing bushes 21 slightly extend these side walls 14s.

Especially FIG. 3 makes clear that in sections a collar 40 projects from the edge of the apertures 13d on the secondary yoke 13 so that the surface of the press-fit for the pivot pin 30 is increased. Thereby this pivot pin 30 immediately lies on the lower surface of the web 13t, what can clearly be seen in FIG. 2. The result is a constructive form that takes little space and comprises an absolutely non-rotatable connection between the pivot pin 30 and the secondary yoke 13. The pivot pin 30 that is cylindrical all along its length is preferably made of chrome steel because this material seems to combine sufficient stability with good gliding qualities. The distance member 20 is injection molded from plastics with good gliding qualities in a known way so that a long lifetime of the articulation without substantial play can be reckoned upon. Since due to the missing rivet head the pivot pin 30 does not touch the main yoke, there is no corrosion at the outsides of the primary yoke 14. At the point where the secondary yoke and the pivot pin touch each other, corrosion could occur, but there is little tendency of corrosion at this point because this area is protected by the primary yoke. Furthermore corrosion does not affect the wiping behaviour decisively because it occurrs at a point where press-fit and not mounting is provided. Of course, also the pivot pin and the secondary yoke could be prevented from touching each other metallically—for instance by means of plastic coating of the pivot pin 30. For reasons of costs, however, this is not done in general.

What is claimed is:

1. A method of manufacturing a windshield wiper blade including a rubber wiping element and a multi-part carrier yoke system carrying said element, said yoke system including a secondary yoke pivotally mounted to a primary yoke at an attachment point, said method comprising the steps of:

forming each of said primary and secondary yokes with generally U-shaped cross-sections at said attachment point having generally parallel sidewalls and including laterally opposed apertures in said generally parallel sidewalls of said primary and secondary yokes installing bushing means for positive non-rotatable retention within said primary yoke to define enlarged radially inwardly directed bearing surfaces within said laterally opposed apertures in said sidewalls of said primary yoke;

positioning said secondary yoke within said primary yoke to coaxially align said laterally Opposed apertures in said sidewalls of said primary and secondary yokes;

axially inserting a substantially uniform transverse cross-section pivot pin through said apertures for rotational slip fit with respect to both of said bearing surfaces and for non-rotatable press fit with respect to the apertures in said sidewalls of said secondary yoke; and subsequently affixing said pin for positive axial retention with respect to said secondary yoke.

2. The method of claim 1, wherein said step of affixing said pin and secondary yoke comprises the step of attaching a generally central portion of said pin to inside surfaces of said secondary yoke.

3. The method of claim 2, wherein said step of affixing said pin and secondary yoke comprises forming radially outwardly extending projections on a generally central portion of said pin intermediate the sidewalls of said secondary yoke.

4. A method for manufacturing a wiper blade for a windshield wiper system of a motor vehicle, said wiper blade including an elongated primary yoke and an elongated secondary yoke, each yoke having an at least approximately U-shaped, transverse cross-section with side walls arranged generally parallel with respect to each other, the side wall of each yoke interconnected by a web, each yoke having a pair of coaxially aligned apertures formed in said side walls, the method comprising the steps of:

positively fixing bearing bushes non-rotatively in said pair of apertures of said primary yoke, said bearing bushes having transverse sides extending outwardly to project beyond an outer surface of each of said side walls of said primary yoke;

nesting at least a portion of said secondary yoke within said primary yoke adjacent an attachment point;

coaxially arranging said pairs of apertures provided in each yoke with respect to one another at said attachment point;

positively connecting an elongated pivot pin non-rotatably into said pair of apertures of said secondary yoke through said coaxially arranged pairs of apertures at said attachment point, said pivot pin of substantially uniform transverse cross-section along its length; and rotatably mounting opposite ends of said pivot pin in said bearing bushes, said pivot pin having transverse ends extending outwardly to project beyond said transverse sides of said bearing bushes so that a rotational bearing surface area between the pivot pin and the bearing bushes is enlarged.

5. The method of claim 4 wherein said positively connecting step further comprises the step of:

press fitting said pivot pin through said coaxially arranged pairs of apertures of said primary and secondary yokes at said attachment point.

6. The method of claim 5 further comprising the step of:

securing the pivot pin axially with respect to the secondary yoke.

7. The method of claim 6 wherein said securing step further comprises the step of:

punching out, longitudinally spaced projections on the pivot pin, said projections disposed adjacent collars extending inwardly out of each side wall of said secondary yoke, said collars forming edges of the secondary yoke apertures and defining an enlarged surface area engaging the press fit pivot pin, said projections holding the pivot pin against axial displacement with respect to the secondary yoke.

* * * * *

UNITED STATES PATENT AND TRADEMARK OFFICE
CERTIFICATE OF CORRECTION

PATENT NO. : 5,339,510
DATED : August 23, 1994
INVENTOR(S) : Christian Roth

It is certified that error appears in the above-indentified patent and that said Letters Patent is hereby corrected as shown below:

Column 2, line 43 after "is" please insert "a".

Column 4, line 24 after "yokes" please insert ";".

Column 4, line 31 please delete "Opposed" and insert --opposed--.

Signed and Sealed this

Fourteenth Day of March, 1995

Attest:

BRUCE LEHMAN

Attesting Officer

Commissioner of Patents and Trademarks